US006330370B2

(12) United States Patent
Goyal et al.

(10) Patent No.: US 6,330,370 B2
(45) Date of Patent: *Dec. 11, 2001

(54) MULTIPLE DESCRIPTION TRANSFORM CODING OF IMAGES USING OPTIMAL TRANSFORMS OF ARBITRARY DIMENSION

(75) Inventors: Vivek K. Goyal, Hoboken, NJ (US); Jelena Kovacevic, New York, NY (US); Martin Vetterli, Grandvaux (CH)

(73) Assignee: Lucent Technologies Inc., Murray Hill, NJ (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/163,655

(22) Filed: Sep. 30, 1998

Related U.S. Application Data

(63) Continuation-in-part of application No. 09/030,488, filed on Feb. 25, 1998.

(51) Int. Cl.[7] ........................................ G06K 9/36

(52) U.S. Cl. ........................................ 382/251

(58) Field of Search .................................... 382/232, 236, 382/238, 240, 242, 248, 250; 358/432, 433; 348/384, 394, 395, 400–404, 407–416, 420, 421, 425, 430, 431, 695; 341/51, 63, 65, 67, 107

(56) References Cited

U.S. PATENT DOCUMENTS 5,836,003 * 11/1998 Sadeh .................................... 341/51
6,018,303 * 1/2000 Sadeh .................................... 341/51

OTHER PUBLICATIONS

Batllo et al., Asymptotic Performance of Multiple Description Transform Codes, IEEE Trans. on Infor. Theor., vol. 43, No. 2, pp. 703–709, Mar. 1997.*

The Bell System Technical Journal, "Source Coding" pp. 1681–1721, Nov. 1974.*

(List continued on next page.)

*Primary Examiner*—Jose L. Couso
(74) *Attorney, Agent, or Firm*—Ryan, Mason & Lewis, LLP

(57) ABSTRACT

A multiple description (MD) joint source-channel (JSC) encoder in accordance with the invention encodes n components of an image signal for transmission over m channels of a communication medium. In an illustrative embodiment which uses statistical redundancy between the different descriptions of the image signal, the encoder forms vectors from transform coefficients of the image signal separated both in frequency and in space. The vectors may be formed such that the spatial separation between the transform coefficients is maximized. A correlating transform is then applied, followed by entropy coding, grouping as a function of frequency, and application of a cascade transform. In an illustrative embodiment which uses deterministic redundancy between the different descriptions of the image signal, the encoder may apply a linear transform, followed by quantization, to generate the multiple descriptions of the image signal. For example, vectors may be formed from transform coefficients of the image signal so as to include coefficients of like frequency separated in space. The vectors are expanded by multiplication with a frame operator, and then quantized using a step size which may be a function of frequency.

16 Claims, 7 Drawing Sheets

OTHER PUBLICATIONS

Orchard et al., Redundancy Rate–Distortrion Analysis of Multiple Description Coding using Pair wise Correlating Transtorms, IEEE, pp. 608–611, 1997.*

Batllo et al., Multiple Description Transform Codes with an Application to Packetized Speech, IEEE, p. 458, 1994.*

Batllo et al., "Multiple Description Source Encoding of Gaussian Random Variable: A Geometric Treatment", IEEE, p. 273, 1997.*

Yang et al. Low Delay Communication for Raleigh Fading Channels: An Application of the Multiple Description Quantizers, IEEE Trans. on Comm., vol. 43, No. 11, pp. 2771–2783, 1995.*

Vaishampayan, "Design of Multiple Description Scalar Quantizers", IEEE Trans. on Inf. The, vol. 39, No. 3, pp. 821–834.*

Subrahmanya et al. "Multiple Descriptions Encoding of Images" pp. 1–10, 1996.*

Pentland, Alex, "Multiple Model encoding of Images", MIT, pp 1509–1513, 1993.*

Zhang et al., "New Results in Binary Multiple Descriptions", IEEE Trans. on Information Th; Vol. IT–33, No. 4, pp. 502–521, 1987.*

Vaishampayan et al., "Asymtotic Analysis of Multiple Description Quantizers", IEEE Trans. a Inf. Th., pp. 1–20, 1997.*

Vaishampayan, Vinay A., Application of Multiple Description Codes to Image and Video Transmission over Lassy Networks, 7th International Workshop on Packet video. pp 1–6, 1996.*

V.K. Goyal et al., "Multiple Description Transform Coding: Robustness to Erasures Using Tight Frame Expansions," In Proc. IEEE Int. Symp. Inform. Theory, Aug. 1998.

V.K. Goyal and J Kovacevic, "Optimal Multiple Description Transform Coding of Gaussian Vectors," In Proc. IEEE Data Compression Conf., pp. 388–397, Mar. 1998.

* cited by examiner

MULTIPLE DESCRIPTION TRANSFORM CODING OF IMAGES USING OPTIMAL TRANSFORMS OF ARBITRARY DIMENSION

RELATED APPLICATION

The present application is a continuation-in-part of U.S. patent application Ser. No. 09/030,488 filed Feb. 25, 1998 in the name of inventors Vivek K. Goyal and Jelena Kovacevic and entitled "Multiple Description Transform Coding Using Optimal Transforms of Arbitrary Dimension."

FIELD OF THE INVENTION

The present invention relates generally to multiple description transform coding (MDTC) of signals for transmission over a network or other type of communication medium, and more particularly to MDTC of images.

BACKGROUND OF THE INVENTION

Multiple description transform coding (MDTC) is a type of joint source-channel coding (JSC) designed for transmission channels which are subject to failure or "erasure." The objective of MDTC is to ensure that a decoder which receives an arbitrary subset of the channels can produce a useful reconstruction of the original signal. One type of MDTC introduces correlation between transmitted coefficients in a known, controlled manner so that lost coefficients can be statistically estimated from received coefficients. This correlation is used at the decoder at the coefficient level, as opposed to the bit level, so it is fundamentally different than techniques that use information about the transmitted data to produce likelihood information for the channel decoder. The latter is a common element in other types of JSC coding systems, as shown, for example, in P. G. Sherwood and K. Zeger, "Error Protection of Wavelet Coded Images Using Residual Source Redundancy," Proc. of the 31st Asilomar Conference on Signals, Systems and Computers, November 1997. Other types of MDTC may be based on techniques such as frame expansions, as described in V. K. Goyal et al., "Multiple Description Transform Coding: Robustness to Erasures Using Tight Frame Expansions," In Proc. IEEE Int. Symp. Inform. Theory, August 1998.

A known MDTC technique for coding pairs of independent Gaussian random variables is described in M. T. Orchard et al., "Redundancy Rate-Distortion Analysis of Multiple Description Coding Using Pairwise Correlating Transforms," Proc. IEEE Int. Conf. Image Proc., Santa Barbara, Calif., October 1997. This MDTC technique provides optimal 2×2 transforms for coding pairs of signals for transmission over two channels. However, this technique as well as other conventional techniques fail to provide optimal generalized n×m transforms for coding any n signal components for transmission over any m channels. In addition, conventional transforms such as those in the M. T. Orchard et al. reference fail to provide a sufficient number of degrees of freedom, and are therefore unduly limited in terms of design flexibility. Moreover, the optimality of the 2×2 transforms in the M. T. Orchard et al. reference requires that the channel failures be independent and have equal probabilities. The conventional techniques thus generally do not provide optimal transforms for applications in which, for example, channel failures either are dependent or have unequal probabilities, or both. These and other drawbacks of conventional MDTC prevent its effective implementation in many important applications.

SUMMARY OF THE INVENTION

The invention provides MDTC techniques which can be used to implement optimal or near-optimal n×m transforms for coding any number n of signal components for transmission over any number m of channels. A multiple description (MD) joint source-channel (JSC) encoder in accordance with an illustrative embodiment of the invention encodes n components of an image signal for transmission over m channels of a communication medium, in applications in which at least one of n and m may be greater than two, and in which the failure probabilities of the m channels may be non-independent and non-equivalent.

In accordance with one aspect of the invention, the MD JSC encoder may be configured to provide statistical redundancy between different descriptions of the image signal. For example, the encoder may form vectors from discrete cosine transform (DCT) coefficients of the image signal separated both in frequency and in space. The vectors may be formed such that the spatial separation between the DCT coefficients is maximized. A correlating transform is applied to the resulting vectors, followed by entropy coding, grouping of the coded vectors as a function of frequency, and application of a cascade transform to each of the groups, in order to generate the multiple descriptions of the image signal.

In accordance with another aspect of the invention, the MD JSC encoder may be configured to provide deterministic redundancy between different descriptions of the image signal. For example, the encoder may form vectors from DCT coefficients of the image signal so as to include coefficients of like frequency separated in space. The vectors are expanded by multiplication with a frame operator, and then quantized using a step size which may be a function of frequency, in order to generate the multiple descriptions of the image signal. In both the statistical redundancy and deterministic redundancy embodiments noted above, other types of linear transforms may be used in place of the DCT.

An MD JSC encoder in accordance with the invention may include a series combination of N "macro" MD encoders followed by an entropy coder, and each of the N macro MD encoders includes a parallel arrangement of M "micro" MD encoders. Each of the M micro MD encoders implements one of: (i) a quantizer block followed by a transform block, (ii) a transform block followed by a quantizer block, (iii) a quantizer block with no transform block, and (iv) an identity function. In addition, a given n×m transform implemented by the MD JSC encoder may be in the form of a cascade structure of several transforms each having dimension less than n×m. This general MD JSC encoder structure allows the encoder to implement any desired n×m transform while also minimizing design complexity.

The MDTC techniques of the invention do not require independent or equivalent channel failure probabilities. As a result, the invention allows MDTC to be implemented effectively in a much wider range of applications than has heretofore been possible using conventional techniques. The MDTC techniques of the invention are suitable for use in conjunction with signal transmission over many different types of channels, including, for example, lossy packet networks such as the Internet, wireless networks, and broadband ATM networks.

DETAILED DESCRIPTION OF THE INVENTION

The invention will be illustrated below in conjunction with exemplary MDTC systems. The techniques described may be applied to transmission of a wide variety of different types of signals, including data signals, speech signals, audio signals, image signals, and video signals, in either compressed or uncompressed formats. The term "channel" as used herein refers generally to any type of communication medium for conveying a portion of an encoded signal, and is intended to include a packet or a group of packets. The term "packet" is intended to include any portion of an encoded signal suitable for transmission as a unit over a network or other type of communication medium. The term "linear transform" should be understood to include a discrete cosine transform (DCT) as well as any other type of linear transform. The term "vector" as used herein is intended to include any grouping of coefficients or other elements representative of at least a portion of a signal.

Figure 1:
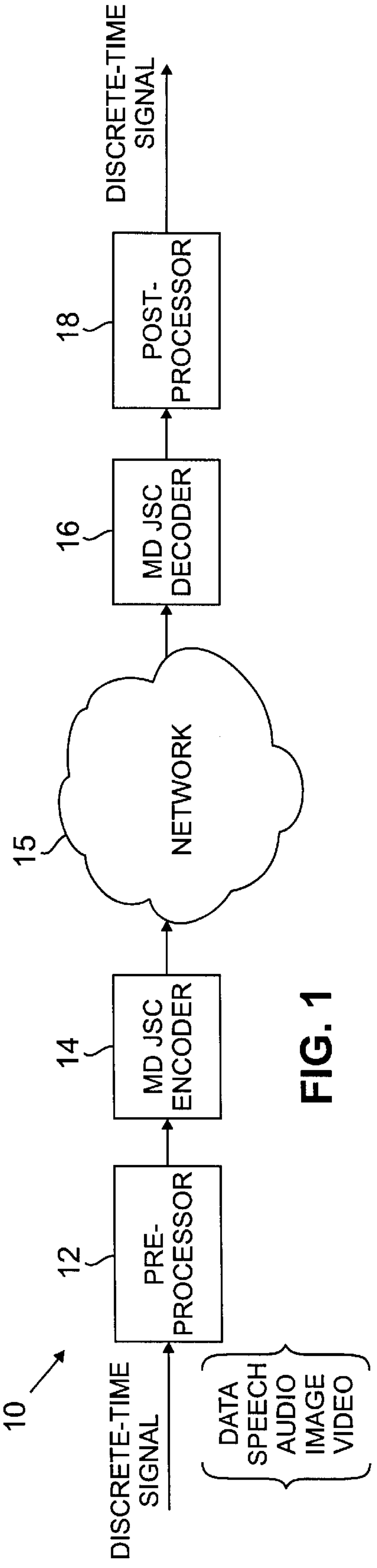
FIG. 1 shows an exemplary communication system in accordance with the invention.

FIG. 1 shows a communication system 10 configured in accordance with an illustrative embodiment of the invention. A discrete-time signal is applied to a pre-processor 12. The discrete-time signal may represent, for example, a data signal, a speech signal, an audio signal, an image signal or a video signal, as well as various combinations of these and other types of signals. The operations performed by the pre-processor 12 will generally vary depending upon the application. The output of the preprocessor is a source sequence $\{x_k\}$ which is applied to a multiple description (MD) joint source-channel (JSC) encoder 14. The encoder 14 encodes n different components of the source sequence $\{x_k\}$ for transmission over m channels, using transform, quantization and entropy coding operations. Each of the m channels may represent, for example, a packet or a group of packets. The m channels are passed through a network 15 or other suitable communication medium to an MD JSC decoder 16. The decoder 16 reconstructs the original source sequence $\{x_k\}$ from the received channels. The MD coding implemented in encoder 14 operates to ensure optimal reconstruction of the source sequence in the event that one or more of the m channels are lost in transmission through the network 15. The output of the MD JSC decoder 16 is further processed in a post processor 18 in order to generate a reconstructed version of the original discrete-time signal.

Figure 2:
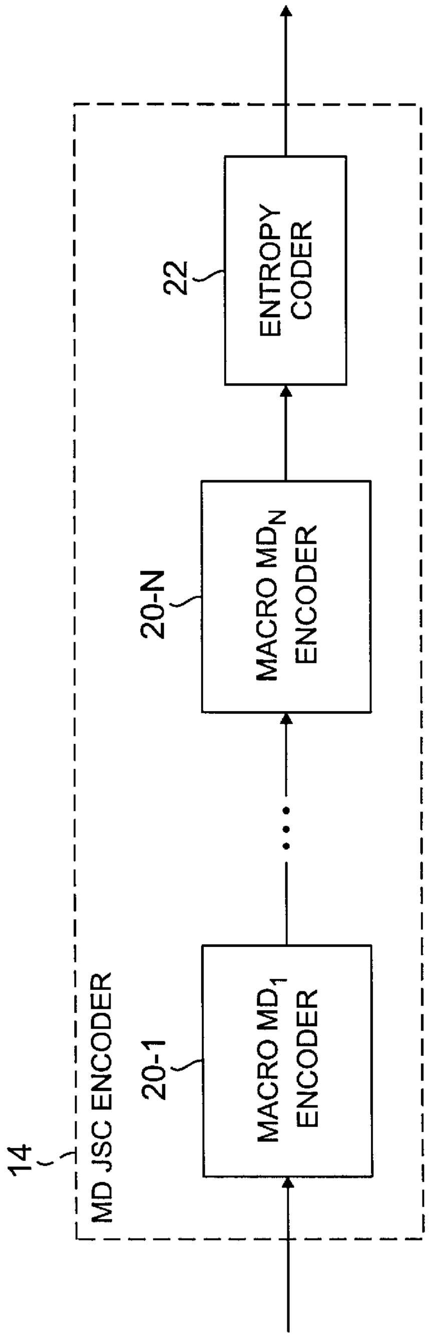
FIG. 2 shows a multiple description (MD) joint source-channel (JSC) encoder in accordance with the invention.
Figure 3:
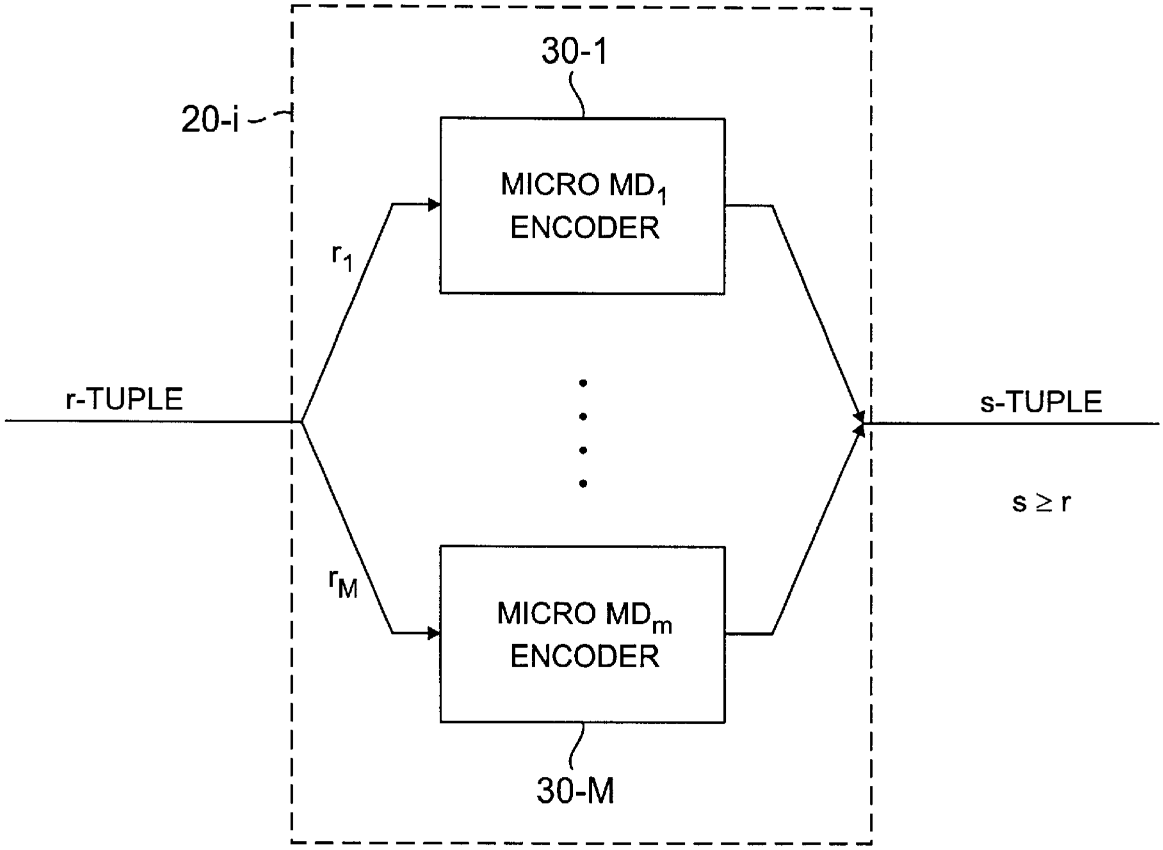
FIG. 3 shows an exemplary macro MD encoder for use in the MD JSC encoder of FIG. 2.

FIG. 2 illustrates the MD JSC encoder 14 in greater detail. The encoder 14 includes a series arrangement of N macro $MD_i$ encoders $MD_1$, . . . $MD_N$ corresponding to reference designators 20-1, . . . 20-N. An output of the final macro $MD_i$ encoder 20-N is applied to an entropy coder 22. FIG. 3 shows the structure of each of the macro $MD_i$ encoders 20-i. Each of the macro $MD_i$ encoders 20-i receives as an input an r-tuple, where r is an integer. Each of the elements of the r-tuple is applied to one of M micro $MD_j$ encoders $MD_1$, . . . $MD_N$ corresponding to reference designators 30-1, . . . 30-M. The output of each of the macro $MD_i$ encoders 20-i is an s-tuple, where s is an integer greater than or equal to r.

Figure 4:
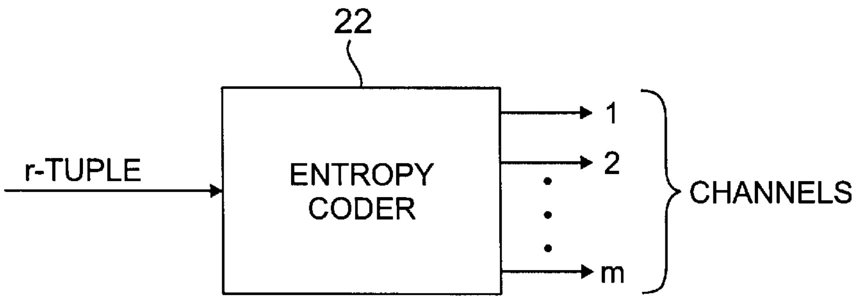
FIG. 4 shows an entropy encoder for use in the MD JSC encoder of FIG. 2.

FIG. 4 indicates that the entropy coder 22 of FIG. 2 receives an r-tuple as an input, and generates as outputs the m channels for transmission over the network 15. In accordance with the invention, the m channels may have any distribution of dependent or independent failure probabilities. More specifically, given that a channel i is in a state $S_i \in \{0, 1\}$, where $S_i=0$ indicates that the channel has failed while $S_i=1$ indicates that the channel is working, the overall state S of the system is given by the cartesian product of the channel states $S_i$ over m, and the individual channel probabilities may be configured so as to provide any probability distribution function which can be defined on the overall state S.

Figure 5A:
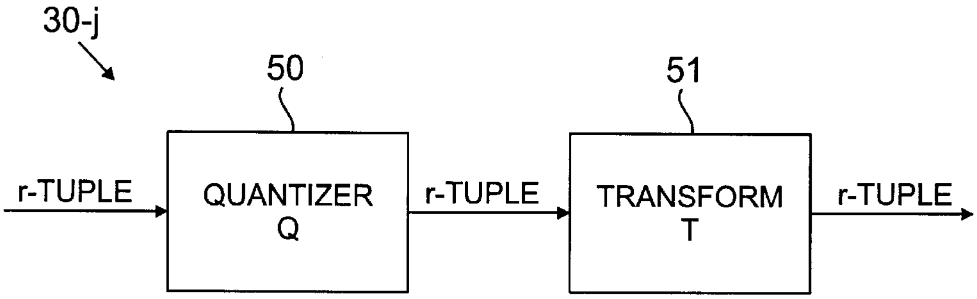
FIGS. 5A through 5D show exemplary micro MD encoders for use in the macro MD encoder of FIG. 3.
Figure 5B:
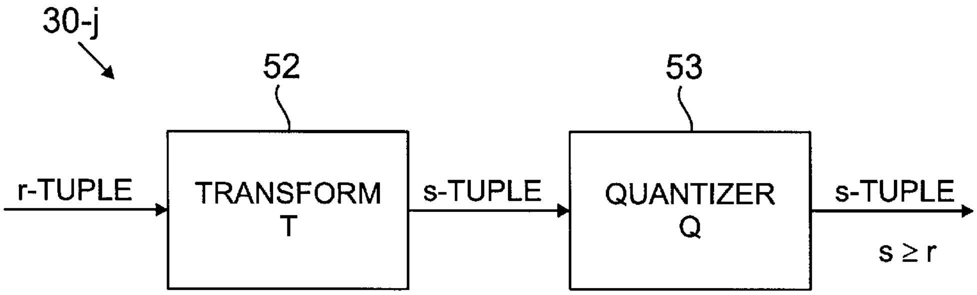
Figure 5C:
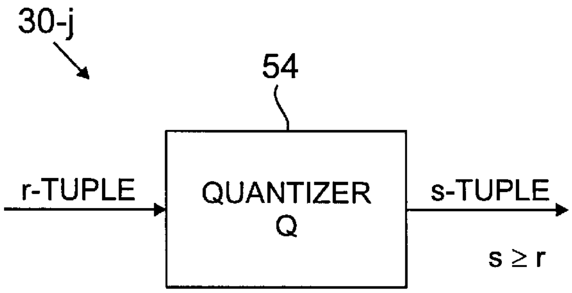
Figure 5D:
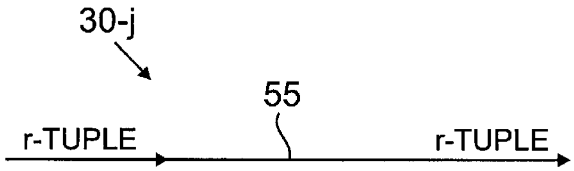

FIGS. 5A through 5D illustrate a number of possible embodiments for each of the micro $MD_j$ encoders 30-j. FIG. 5A shows an embodiment in which a micro $MD_j$ encoder 30-j includes a quantizer (Q) block 50 followed by a transform (T) block 51. The Q block 50 receives an r-tuple as input and generates a corresponding quantized r-tuple as an output. The T block 51 receives the r-tuple from the Q block 50, and generates a transformed r-tuple as an output. FIG. 5B shows an embodiment in which a micro $MD_j$ encoder 30-j includes a T block 52 followed by a Q block 53. The T block 52 receives an r-tuple as input and generates a corresponding transformed s-tuple as an output. The Q block 53 receives the s-tuple from the T block 52, and generates a quantized s-tuple as an output, where s is greater than or equal to r. FIG. 5C shows an embodiment in which a micro $MD_j$ encoder 30-j includes only a Q block 54. The Q block 54 receives an r-tuple as input and generates a quantized s-tuple as an output, where s is greater than or equal to r. FIG. 5D shows another possible embodiment, in which a micro $MD_j$ encoder 30-j does not include a Q block or a T block but instead implements an identity function, simply passing an r-tuple at its input though to its output. The micro $MD_j$ encoders 30-j of FIG. 3 may each include a different one of the structures shown in FIGS. 5A through 5D.

Figure 6A:
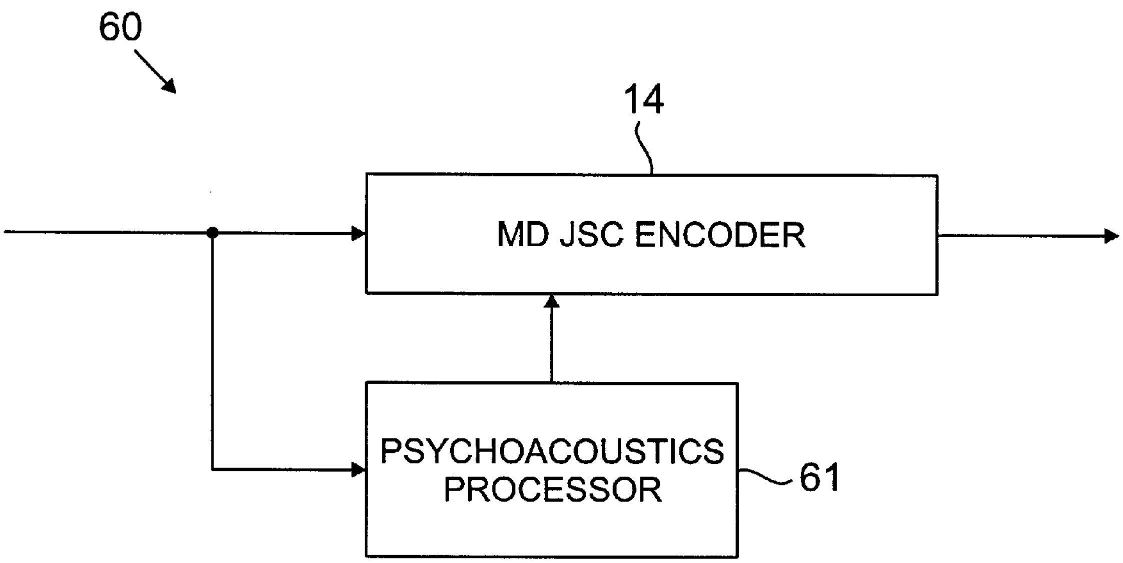
FIGS. 6A, 6B and 6C show respective audio encoder, image encoder and video encoder embodiments of the invention, each including the MD JSC encoder of FIG. 2.
Figure 6B:
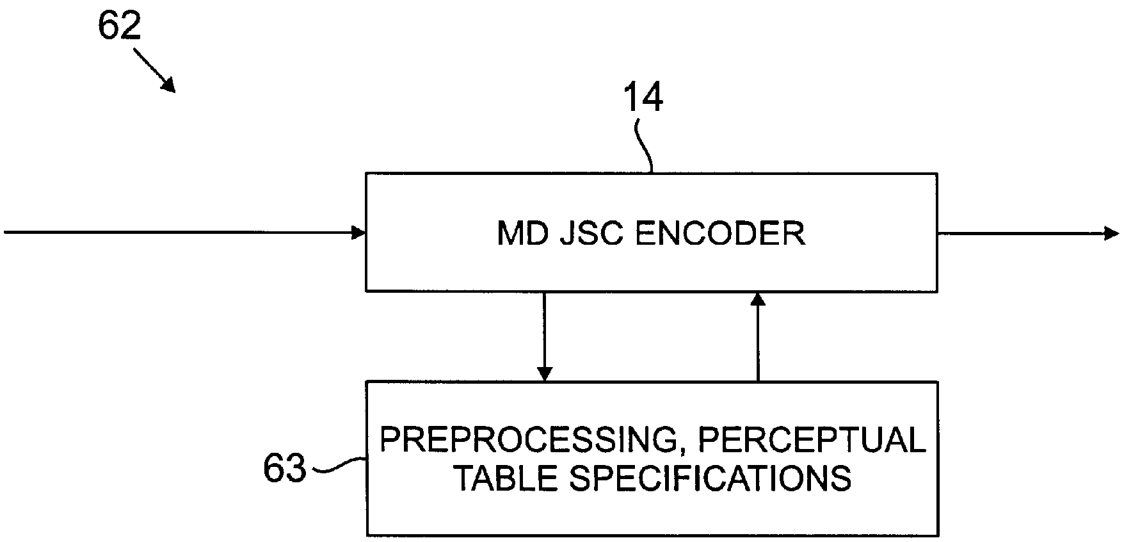
Figure 6C:
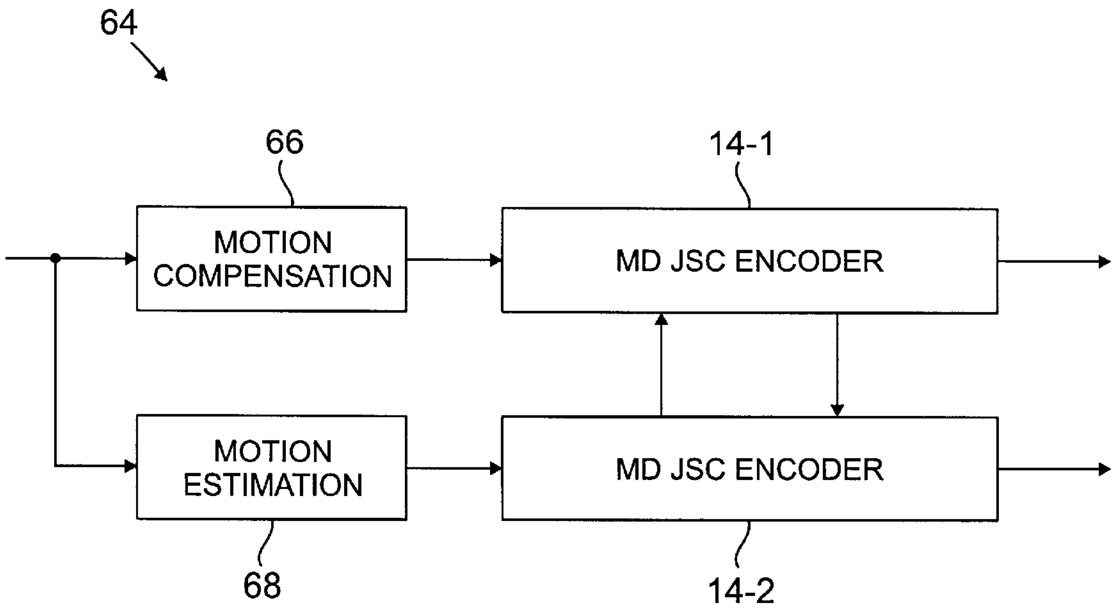

FIGS. 6A through 6C illustrate the manner in which the MD JSC encoder 14 of FIG. 2 can be implemented in a variety of different encoding applications. In each of the embodiments shown in FIGS. 6A through 6C, the MD JSC encoder 14 is used to implement the quantization, transform and entropy coding operations typically associated with the corresponding encoding application. FIG. 6A shows an audio coder 60 which includes an MD JSC encoder 14 configured to receive input from a conventional psychoacoustics processor 61. FIG. 6B shows an image coder 62 which includes an MD JSC encoder 14 configured to interact with an element 63 providing preprocessing functions and perceptual table specifications. FIG. 6C shows a video coder 64 which includes first and second MD JSC encoders 14-1 and 14-2. The first encoder 14-1 receives input from a conventional motion compensation element 66, while the second encoder 14-2 receives input from a conventional motion estimation element 68. The encoders 14-1 and 14-2 are interconnected as shown. It should be noted that these are only examples of applications of an MD JSC encoder in accordance with the invention. It will be apparent to those skilled in the art that numerous alternate configurations may also be used, in audio, image, video and other applications.

A general model for analyzing MDTC techniques in accordance with the invention will now be described. Assume that a source sequence $\{x_k\}$ is input to an MD JSC encoder, which outputs m streams at rates $R_1, R_2, \ldots R_m$. These streams are transmitted on m separate channels. One version of the model may be viewed as including many receivers, each of which receives a subset of the channels and uses a decoding algorithm based on which channels it receives. More specifically, there may be $2^m-1$ receivers, one for each distinct subset of streams except for the empty set, and each experiences some distortion. An equivalent version of this model includes a single receiver when each channel may have failed or not failed, and the status of the channel is known to the receiver decoder but not to the encoder. Both versions of the model provide reasonable approximations of behavior in a lossy packet network. As previously noted, each channel may correspond to a packet or a set of packets. Some packets may be lost in transmission, but because of header information it is known which packets are lost. An appropriate objective in a system which can be characterized in this manner is to minimize a weighted sum of the distortions subject to a constraint on a total rate R. For m=2, this minimization problem is related to a problem from information theory called the multiple description problem. $D_0$, $D_1$ and $D_2$ denote the distortions when both channels are received, only channel 1 is received, and only channel 2 is received, respectively. The multiple description problem involves determining the achievable $(R_1, R_2, D_0, D_1, D_2)$-tuples. A complete characterization for an independent, identically-distributed (i.i.d.) Gaussian source and squared-error distortion is described in L. Ozarow, "On a source-coding problem with two channels and three receivers," Bell Syst. Tech. J., 59(8):1417–1426, 1980. It should be noted that the solution described in the L. Ozarow reference is non-constructive, as are other achievability results from the information theory literature.

An MDTC coding structure for implementation in the MD JSC encoder 14 of FIG. 2 in accordance with the invention will now be described. In this illustrative embodiment, it will be assumed for simplicity that the source sequence $\{x_k\}$ input to the encoder is an i.i.d. sequence of zero-mean jointly Gaussian vectors with a known correlation matrix $R_x=[x_k x_k^T]$. The vectors can be obtained by blocking a scalar Gaussian source. The distortion will be measured in terms of mean-squared error (MSE). Since the source in this example is jointly Gaussian, it can also be assumed without loss of generality that the components are independent. If the components are not independent, one can use a Karhunen-Loeve transform of the source at the encoder and the inverse at each decoder. This embodiment of the invention utilizes the following steps for implementing MDTC of a given source vector x:

1. The source vector x is quantized using a uniform scalar quantizer with stepsize Δ: $x_{qi}=[x_i]_\Delta$, where $[\cdot]_\Delta$ denotes rounding to the nearest multiple of Δ.

2. The vector $x_q=[x_{q1}, x_{q2}, \ldots x_{qn}]^T$ is transformed with an invertible, discrete transform $\hat{T}$: $\Delta Z^n \rightarrow \Delta Z^n$, $y=\hat{T}(x_q)$. The design and implementation of $\hat{T}$ are described in greater detail below.

3. The components of y are independently entropy coded.

4. If m>n, the components of y are grouped to be sent over the m channels.

When all of the components of y are received, the reconstruction process is to exactly invert the transform $\hat{T}$ to get $\hat{x}=x_q$. The distortion is the quantization error from Step 1 above. If some components of y are lost, these components are estimated from the received components using the statistical correlation introduced by the transform $\hat{T}$. The estimate $\hat{x}$ is then generated by inverting the transform as before.

Starting with a linear transform T with a determinant of one, the first step in deriving a discrete version $\hat{T}$ is to factor T into "lifting" steps. This means that T is factored into a product of lower and upper triangular matrices with unit diagonals $T=T_1 T_2 \ldots T_k$. The discrete version of the transform is then given by:

$$\hat{T}(x_q)=[T_1[T_2 \ldots [T_k x_q]_\Delta]_\Delta]_\Delta. \quad (1)$$

The lifting structure ensures that the inverse of $\hat{T}$ can be implemented by reversing the calculations in (1):

$$\hat{T}^{-1}(y)=[T_k^{-1} \ldots [T_2^{-1}[T_1^{-1}y]_\Delta]_\Delta]_\Delta.$$

The factorization of T is not unique. Different factorizations yield different discrete transforms, except in the limit as Δ approaches zero. The above-described coding structure is a generalization of a 2×2 structure described in the above-cited M. T. Orchard et al. reference. As previously noted, this reference considered only a subset of the possible 2×2 transforms; namely, those implementable in two lifting steps.

It is important to note that the illustrative embodiment of the invention described above first quantizes and then applies a discrete transform. If one were to instead apply a continuous transform first and then quantize, the use of a nonorthogonal transform could lead to non-cubic partition cells, which are inherently suboptimal among the class of partition cells obtainable with scalar quantization. See, for example, A. Gersho and R. M. Gray, "Vector Quantization and Signal Compression," Kluwer Acad. Pub., Boston, Mass., 1992. The above embodiment permits the use of discrete transforms derived from nonorthogonal linear transforms, resulting in improved performance.

An analysis of an exemplary MDTC system in accordance with the invention will now be described. This analysis is based on a number of fine quantization approximations which are generally valid for small Δ. First, it is assumed that the scalar entropy of $y=\hat{T}([x]_\Delta)$ is the same as that of $[Tx]_\Delta$. Second, it is assumed that the correlation structure of y is unaffected by the quantization. Finally, when at least one component of y is lost, it is assumed that the distortion is dominated by the effect of the erasure, such that quantization can be ignored. The variances of the components of x are denoted by $\sigma_1^2, \sigma_2^2 \ldots \sigma_n^2$ and the correlation matrix of x is denoted by $R_x$, where $R_x=\mathrm{diag}(\sigma_1^2, \sigma_2^2 \ldots \sigma_n^2$. Let $R_y=TR_xT^T$. In the absence of quantization, $R_y$ would correspond to the correlation matrix of y. Under the above-noted fine quantization approximations, $R_y$ will be used in the estimation of rates and distortions.

The rate can be estimated as follows. Since the quantization is fine, $y_i$ is approximately the same as $[(Tx)_i]_\Delta$, i.e., a uniformly quantized Gaussian random variable. If $y_i$ is treated as a Gaussian random variable with power $\sigma_{yi}^2=(R_y)_{ii}$ quantized with stepsize Δ, the entropy of the quantized coefficient is given by:

$$H(y_i)\approx \tfrac{1}{2}\log 2\pi e\sigma_{yi}^2-\log\Delta=\tfrac{1}{2}\log\sigma_{yi}^2+\tfrac{1}{2}\log 2\pi e-\log\Delta=\tfrac{1}{2}\log\sigma_{yi}^2+k_\Delta,$$

where $k_\Delta$+e,dus Δ (log 2πe)/2−log Δ and all logarithms are base two. Notice that $k_\Delta$ depends only on Δ. The total rate R can therefore be estimated as:

$$R = \sum_{i=1}^{n} H(y_i) = nk_\Delta + \frac{1}{2}\log\prod_{i=1}^{n}\sigma_{yi}^2. \tag{2}$$

The minimum rate occurs when the product from i=1 to n of $\sigma_{yi}^2$ is equivalent to the product from i=1 to n of $\sigma_i^2$, and at this rate the components of y are uncorrelated. It should be noted that T=I is not the only transform which achieves the minimum rate. In fact, it will be shown below that an arbitrary split of the total rate among the different components of y is possible. This provides a justification for using a total rate constraint in subsequent analysis.

The distortion will now be estimated, considering first the average distortion due only to quantization. Since the quantization noise is approximately uniform, the distortion is $\Delta^2/12$ for each component. Thus the distortion when no components are lost is given by:

$$D_0 = \frac{n\Delta^2}{12} \tag{3}$$

and is independent of T.

The case when l>0 components are lost will now be considered. It first must be determined how the reconstruction will proceed. By renumbering the components if necessary, assume that $y_1, y_2, \ldots y_{n-l}$ are received and $y_{n-l+1}, \ldots y_n$ are lost. First partition y into "received" and "not received" portions as $y=[y_r, y_{nr}]$ where $y_r=[y_1, y_2, \ldots y_{n-l}]^T$ and $y_{nr}=[y_{n-l+1}, \ldots y_n]^T$. The minimum MSE estimate $\hat{x}$ of x given $y_r$ is $E[x|y_r]$, which has a simple closed form because in this example x is a jointly Gaussian vector. Using the linearity of the expectation operator gives the following sequence of calculations:

$$\hat{x} = E[x\,|\,y_r] = E[T^{-1}Tx\,|\,y_r] = T^{-1}E[Tx\,|\,y_r] \tag{4}$$
$$= T^{-1}E\left[\begin{bmatrix} y_r \\ y_{nr}\end{bmatrix}\middle|\, y_r\right] = T^{-1}\begin{bmatrix} y_r \\ E[y_{nr}\,|\,y_r]\end{bmatrix}.$$

If the correlation matrix of y is partitioned in a way compatible with the partition of y as: then it can be shown that the conditional signal $y_r|y_{nr}$ is Gaussian with mean $B^T R_1^{-1} y_r$ and $$R_y = TR_xT^T = \begin{bmatrix} R_1 & B \\ B^T & R_2\end{bmatrix},$$

correlation matrix A +e,dus Δ $R_2-B^TR_1^{-1}B$. Thus, $E[y_r|y_{nr}]=B^TR_1^{-1} y_r$, and η+e,dus Δ $y_{nr}-E[y_{nr}|y_r]$ is Gaussian with zero mean and correlation matrix A. The variable η denotes the error in predicting $y_{nr}$ from $y_r$ and hence is the error caused by the erasure. However, because a nonorthogonal transform has been used in this example, $T^{-1}$ is used to return to the original coordinates before computing the distortion. Substituting $y_{nr}-\eta$ in (4) above gives the following expression for $\hat{x}$:

$$T^{-1}\begin{bmatrix} y_r \\ y_{nr}-\eta\end{bmatrix} = x + T^{-1}\begin{bmatrix} 0 \\ -\eta\end{bmatrix},$$

such that $\|x-\hat{x}\|$ is given by:

$$\left\|T^{-1}\begin{bmatrix} 0 \\ \eta\end{bmatrix}\right\|^2 = \eta^T U^T U\eta,$$

where U is the last l columns of $T^{-1}$. The expected value $E[\|x-\hat{x}\|]$ is then given by:

$$\sum_{i=1}^{l}\sum_{j=1}^{l}(U^TU)_{ij}A_{ij}. \tag{5}$$

The distortion with l erasures is denoted by $D_l$. To determine $D_l$, (5) above is averaged over all possible combinations of erasures of l out of n components, weighted by their probabilities if the probabilities are non-equivalent. An additional distortion criteria is a weighted sum $\overline{D}$ of the distortions incurred with different numbers of channels available, where $\overline{D}$ is given by:

$$\sum_{l=1}^{n}\alpha_l D_l.$$

For a case in which each channel has a failure probability of p and the channel failures are independent, the weighting $$\alpha_l = \binom{n}{l}p^l(1-p)^{n-l}$$

makes the weighted sum $\overline{D}$ the overall expected MSE. Other choices of weighting could be used in alternative embodiments. Consider an image coding example in which an image is split over ten packets. One might want acceptable image quality as long as eight or more packets are received. In this case, one could set $\alpha_3=\alpha_4=\ldots=\alpha_{10}=0$.

The above expressions may be used to determine optimal transforms which minimize the weighted sum $\overline{D}$ for a given rate R. Analytical solutions to this minimization problem are possible in many applications. For example, an analytical solution is possible for the general case in which n=2 components are sent over m=2 channels, where the channel failures have unequal probabilities and may be dependent. Assume that the channel failure probabilities in this general case are as given in the following table.

| | | Channel 1 | |
|---|---|---|---|
| | | no failure | failure |
| Channel 2 | failure | $1-P_0-P_1-P_2$ | $P_1$ |
| | no failure | $P_2$ | $P_0$ |

If the transform T is given by:

$$T = \begin{bmatrix} a & b \\ c & d\end{bmatrix},$$

minimizing (2) over transforms with a determinant of one gives a minimum possible rate of:

$$R^* = 2k_\Delta + \log\sigma_1\sigma_2.$$

The difference $\rho=R-R^*$ is referred to as the redundancy, i.e., the price that is paid to reduce the distortion in the presence of erasures. Applying the above expressions for rate and distortion to this example, and assuming that $\sigma_1>\sigma_2$, it can be shown that the optimal transform will satisfy the following expression:

$$|a|=\frac{\sigma_2}{2c\sigma_1}\left[\sqrt{2^{2\rho}-1}+\sqrt{2^{2\rho}-1-4bc(bc+1)}\right].$$

The optimal value of bc is then given by:

$$(bc)_{optimal}=-\frac{1}{2}+\frac{1}{2}\left(\frac{p_1}{p_2}-1\right)\left[\left(\frac{p_1}{p_2}+1\right)^2-4\left(\frac{p_1}{p_2}\right)2^{-2\rho}\right]^{-1/2}.$$

The value of $(bc)_{optimal}$ ranges from −1 to 0 as $p_1/p_2$ ranges from 0 to ∞. The limiting behavior can be explained as follows: Suppose $p_1>>p_2$, i.e., channel 1 is much more reliable than channel 2. Since $(bc)_{optimal}$ approaches 0, ad must approach 1, and hence one optimally sends $x_1$ (the larger variance component) over channel 1 (the more reliable channel) and vice-versa.

If $p_1=p_2$ in the above example, then $(bc)_{optimal}=-1/2$, independent of ρ. The optimal set of transforms is then given by: $a\neq 0$ (but otherwise arbitrary), $c=-\frac{1}{2}b$, $d=\frac{1}{2}a$ and $$b=\pm(2^{\rho}-\sqrt{2^{2\rho}-1})\sigma_1 a/\sigma_2.$$

Using a transform from this set gives:

$$D_1=\frac{1}{2}(D_{1,1}+D_{1,2})=\sigma_1^2-\frac{1}{2\cdot 2^{\rho}\left(2^{\rho}-\sqrt{2^{2\rho}-1}\right)}(\sigma_1^2-\sigma_2^2). \tag{6}$$

For values of $\sigma_1=1$ and $\sigma_2=0.5$, $D_1$, as expected, starts at a maximum value of $(\sigma_1^2+\sigma_2^2)/2$ and asymptotically approaches a minimum value of $\sigma_2^2$. By combining (2), (3) and (6), one can find the relationship between R, $D_0$ and $D_1$. It should be noted that the optimal set of transforms given above for this example provides an "extra" degree of freedom, after fixing ρ, that does not affect the ρ vs. $D_1$ performance. This extra degree of freedom can be used, for example, to control the partitioning of the total rate between the channels, or to simplify the implementation.

Although the conventional 2×2 transforms described in the above-cited M. T. Orchard et al. reference can be shown to fall within the optimal set of transforms described herein when channel failures are independent and equally likely, the conventional transforms fail to provide the above-noted extra degree of freedom, and are therefore unduly limited in terms of design flexibility. Moreover, the conventional transforms in the M. T. Orchard et al. reference do not provide channels with equal rate (or, equivalently, equal power). The extra degree of freedom in the above example can be used to ensure that the channels have equal rate, i.e., that $R_1=R_2$, by implementing the transform such that $|a|=|c|$ and $|b|=|d|$. This type of rate equalization would generally not be possible using conventional techniques without either rendering the resulting transform suboptimal or introducing additional complexity, e.g., through the use of multiplexing.

As previously noted, the invention may be applied to any number of components and any number of channels. For example, the above-described analysis of rate and distortion may be applied to transmission of n=3 components over m=3 channels. Although it becomes more complicated to obtain a closed form solution, various simplifications can be made in order to obtain a near-optimal solution. If it is assumed in this example that $\sigma_1>\sigma_2>\sigma_3$, and that the channel failure probabilities are equal and small, a set of transforms that gives near-optimal performance is given by:

$$\begin{bmatrix} a & -\frac{\sqrt{3}\sigma_1 a}{\sigma_2} & -\frac{\sigma_2}{6\sqrt{3}\sigma_1^2 a^2} \\ 2a & 0 & \frac{\sigma_2}{6\sqrt{3}\sigma_1^2 a^2} \\ a & \frac{\sqrt{3}\sigma_1 a}{\sigma_2} & -\frac{\sigma_2}{6\sqrt{3}\sigma_1^2 a^2} \end{bmatrix}.$$

Optimal or near-optimal transforms can be generated in a similar manner for any desired number of components and number of channels.

Figure 7:
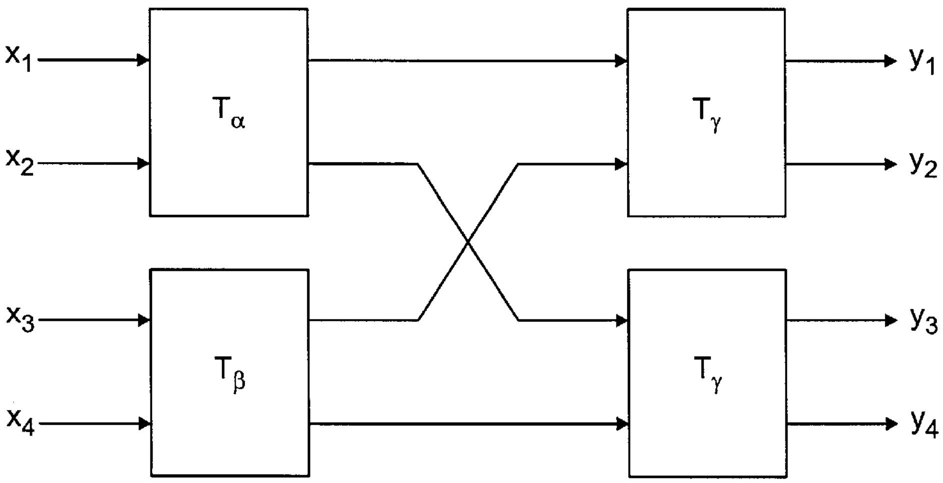
FIG. 7 illustrates an exemplary 4×4 cascade structure which may be used in an MD JSC encoder in accordance with the invention.

FIG. 7 illustrates one possible way in which the MDTC techniques described above can be extended to an arbitrary number of channels, while maintaining reasonable ease of transform design. This 4×4 transform embodiment utilizes a cascade structure of 2×2 transforms, which simplifies the transform design, as well as the encoding and decoding processes (both with and without erasures), when compared to use of a general 4×4 transform. In this embodiment, a 2×2 transform $T_\alpha$ is applied to components $x_1$ and $x_2$, and a 2×2 transform $T_\beta$ is applied to components $x_3$ and $x_4$. The outputs of the transforms $T_\alpha$ and $T_\beta$ are routed to inputs of two 2×2 transforms $T_\gamma$ as shown. The outputs of the two 2×2 transforms $T_\gamma$ correspond to the four channels $y_1$ through $y_4$. This type of cascade structure can provide substantial performance improvements as compared to the simple pairing of coefficients in conventional techniques, which generally cannot be expected to be near optimal for values of m larger than two. Moreover, the failure probabilities of the channels $y_1$ through $y_4$ need not have any particular distribution or relationship. FIGS. 2, 3, 4 and 5A–5D above illustrate more general extensions of the MDTC techniques of the invention to any number of signal components and channels.

Illustrative embodiments of the invention more particularly directed to transmission of images will be described below with reference to the flow diagrams of FIGS. 8 and 9. A conventional technique for communicating an image over a network such as the Internet is to use a progressive encoding system and to transmit the coded image as a sequence of packets over a Transmission Control Protocol (TCP) connection. When there are no packet losses, the receiver can reconstruct the image as the packets arrive; but when there is a packet loss, there is a large period of latency while the transmitter determines that the packet must be retransmitted and then retransmits the packet. The latency is due to the fact that the application at the receiving end typically uses the packets only after they have been put in the proper sequence. The use of another transmission protocol generally does not solve the problem: because of the progressive nature of the encoding, the packets are useful only in the proper sequence. The problem is more acute if there are stringent delay requirements, e.g., for fast browsing, and in some cases retransmission may be not just undesirable but impossible. The present invention alleviates this latency problem by providing a communication system that is robust to arbitrarily placed packet erasures and that can reconstruct an image progressively from packets received in any order.

Figure 8:
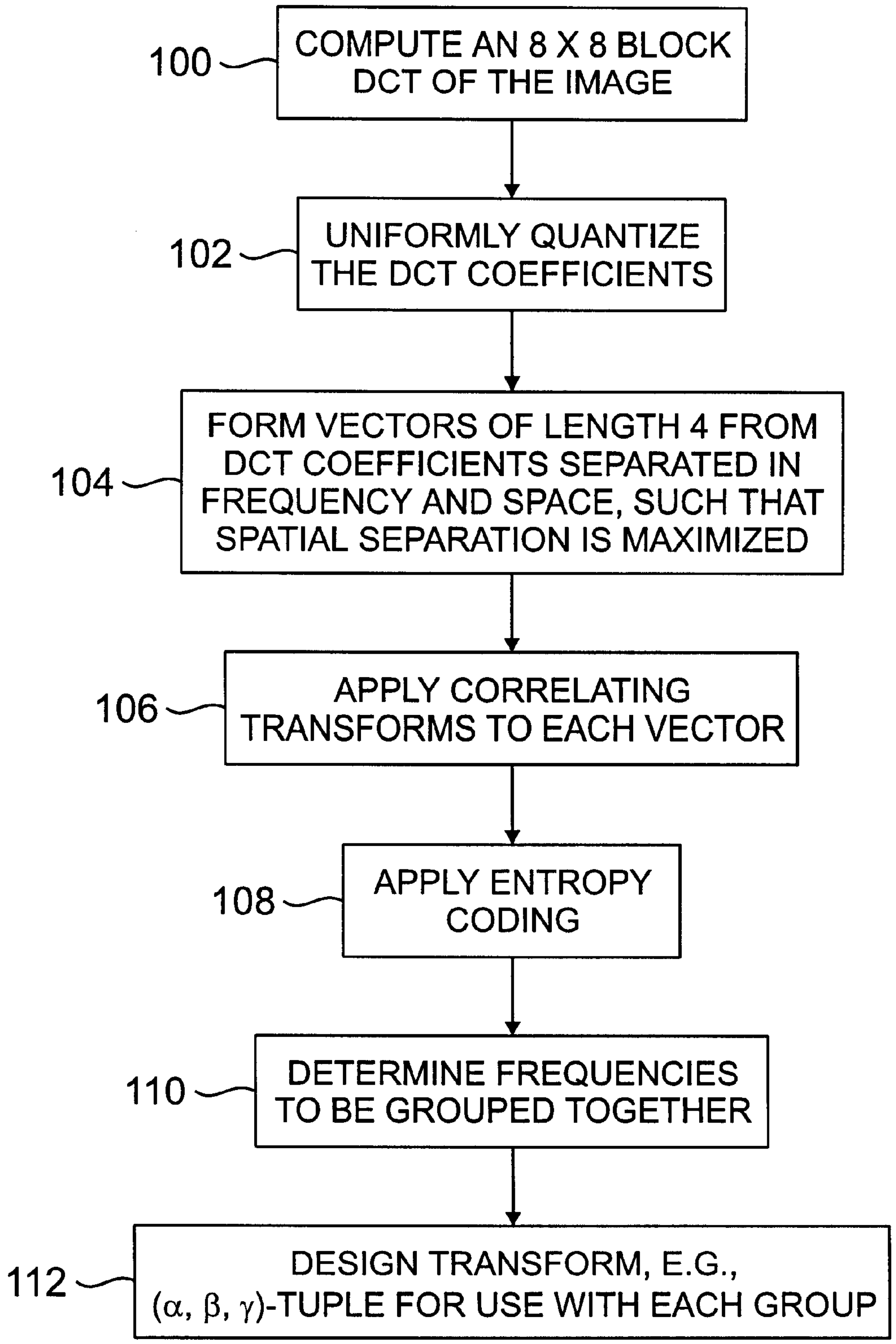
FIGS. 8 and 9 are flow diagrams illustrating exemplary image encoding processes in accordance with the invention.

The flow diagram of FIG. 8 illustrates an example of an MDTC process particularly well suited for use with still images. In this example, the process codes four channels using a technique which operates on source vectors with uncorrelated components. In accordance with the invention, a suitable approximation of this condition can be obtained by forming vectors from discrete cosine transform (DCT)

coefficients separated both in frequency and in space. It should be noted that the use of the DCT in the embodiments of FIGS. 8 and 9 is by way of example only, and any other suitable linear transform could also be used. In step 100 of FIG. 8, an 8×8 block DCT of the image is computed. The DCT coefficients are then uniformly quantized in step 102. In step 104, vectors of length 4 are formed from DCT coefficients separated in frequency and in space. The spatial separation is maximized, e.g., for 512×512 images, the samples that are grouped together are spaced by 256 pixels horizontally and/or vertically. Correlating transforms are then applied to each 4-tuple vector, as indicated in step 106. Entropy encoding, such as, e.g., JPEG coding, is then applied in step 108.

After the above steps 100–108 are performed, a determination is made in step 110 as to which frequencies are to be grouped together, and a cascade transform of the type illustrated in FIG. 7, i.e., an (α, β, γ)-tuple, is designed in step 112 for each group of frequencies. The operations in steps 110 and 112 can be based, e.g., on training data or other considerations. It should be noted that, even in cases in which the source data is characterized by, e.g., a Gaussian model, the transform parameters should be numerically optimized. The embodiment illustrated in FIG. 8 may be implemented using one or more of the micro $MD_j$ encoders 30-j of FIG. 5A, each of which includes a quantizer (Q) block 50 followed by a transform (T) block 51. As previously noted, the Q block 50 receives an r-tuple as input and generates a corresponding quantized r-tuple as an output. The T block 51 receives the r-tuple from the Q block 50, and generates a transformed r-tuple as an output.

In the embodiment of FIG. 8, the importance of the DC coefficient may dictate allocating most of the redundancy to the group containing the DC coefficient. In an alternative embodiment, it may be assumed that the quantized DC coefficient is communicated reliably through some other means, e.g., a separate channel. The remaining coefficients are then separated, e.g, into those that are placed in groups of four and those that are sent by one of the four channels only. Because the optimal allocation of redundancy between the groups is often difficult to determine, it may instead be desirable to allocate approximately the same redundancy to each group. The AC coefficients for each block are then sent over one of the four channels. It can be shown that such an embodiment provides a higher quality reconstructed image when one of four packets is lost, at the expense of worse rate-distortion performance when there are no packet losses. In addition, the expected number of bits for each channel is approximately equal, which facilitates packetization. This is in contrast to certain conventional techniques in which one must multiplex channel bit streams in order to produce packets of approximately the same size.

It should be noted that effects of factors such as coarse quantization, dead zone, divergence from Gaussian, run length coding and Huffman coding are not addressed in the above examples, but could be addressed through, e.g., an expansive numerical optimization. The encoding process could be further improved by, e.g., using a perceptually tuned quantization matrix as suggested by the JPEG standard, rather than the uniform quantization used for simplicity in the above examples. Using perceptually tuned quantization, one can design a system which, e.g., performs as well as conventional systems when two or four of four packets arrive, but which performs better when one or three packets arrive.

In the embodiment of FIG. 8, the redundancy in the source representation is statistical, i.e., the distribution of one part of the representation is reduced in variance by conditioning on another part. Another possible technique for implementing MDTC of images in accordance with the invention, illustrated in the flow diagram of FIG. 9, uses a deterministic redundancy between descriptions. Consider a conventional discrete block code which represents k input symbols through a set of n output symbols such that any k of the n can be used to recover the original k. One possible example is a systematic (n, k) Reed-Solomon code over $GF(2^m)$ with $n=2^m-1$, as described in S. Lin and D. J. Costello, "Error Control Coding: Fundamentals and Applications," Prentice-Hall, 1983. If the k input symbols are quantized transform coefficients, the discrete block code may be a good way to communicate a k-dimensional source over an erasure channel that erases symbols with probability less than (n−k)/n. A problem with this conventional approach is that except in the case that exactly k of the n transmitted symbols are received, the channel has not been used efficiently. When more than k symbols are received, those in excess of k provide no information about the source vector; and when less than k symbols are received, it is computationally difficult to use more than just the systematic part of the code.

An alternative to the above-described discrete block coding involves using a linear transform from $R^k$ to $R^n$, followed by scalar quantization, to generate n descriptions of a k-dimensional source. These n descriptions are such that a good reconstruction can be computed from any k descriptions, but also descriptions beyond the kth are also useful and reconstructions from less than k descriptions are easy to compute.

Assume that we have a tight frame $\Phi=\{\phi^m\}^n_{k=1} \subset R^k$ with $\|\phi^m\|=1$ for all m and that y=Fx, where F is the frame operator associated with Φ as described in, for example, V. K. Goyal, M. Vetterli and N. T. Thao, "Quantized Overcomplete Expansions in $R^N$: Analysis, Synthesis and Algorithms," IEEE Trans. Inform. Th., 44(1):16–31, 1998, which is incorporated by reference herein. This vector passes through the scalar quantizer Q: $\hat{y}=Q(y)$. The entropy-coded components of $\hat{y}$ can each be considered a description of x. For simplicity, it will be assumed that Q is a uniform quantizer with step size Δ and that n<2k. If m≧k of the components of $\hat{y}$ are known to the decoder, then x can be specified to within a cell with diameter approximately equal to Δ and thus is well approximated. Since the constraints on x provided by each description are independent, on average, the diameter is a non-increasing function of m. When m<k components of $\hat{y}$ are received, $R^k$ can be partitioned into an m-dimensional subspace and a (k−m)-dimensional orthogonal subspace, such that the component of x in the first subspace is well specified. With a mild zero-mean condition on the component in the latter space, a reasonable estimate of x is easily computed. For any m, estimating x can be posed as a simple least-squares problem, although for m≧k, a better estimate may be found by exploiting the boundedness of the quantization error, as described in the above-cited V. Goyal et al. reference.

Figure 9:
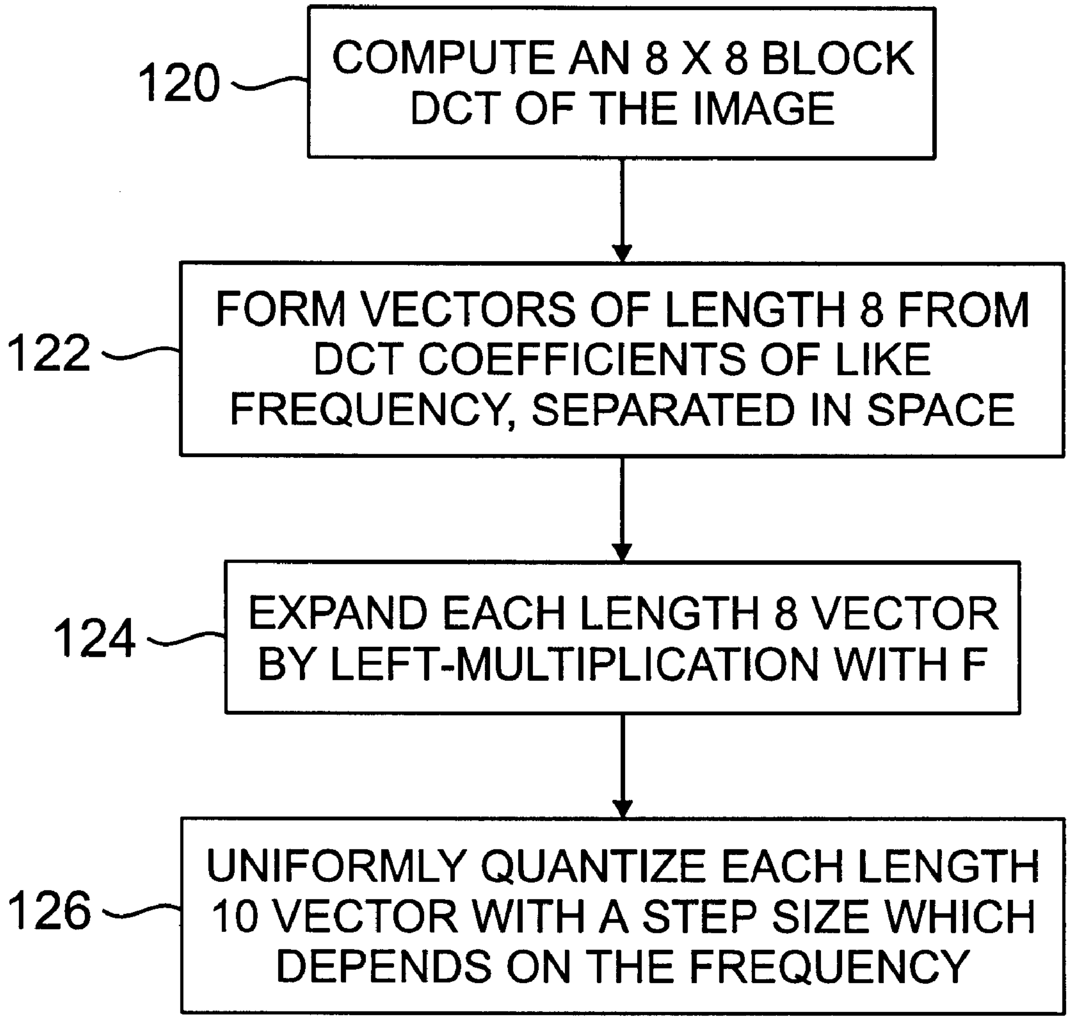

The flow diagram of FIG. 9 is an example of the above-described deterministic redundancy approach, using a frame alternative to a (10, 8) block code. For the 10×8 frame operator F we use a matrix corresponding to a length-10 real Discrete Fourier Transform (DFT) of a length-8 sequence. This matrix can be constructed as $F=[F^{(1)}\ F^{(2)}]$, where $$F_{ij}^{(1)} = \frac{1}{2}\cos\frac{\pi(i-1)(2j-1)}{10} \text{ and}$$

$$F_{ij}^{(2)} = \frac{1}{2}\sin\pi(i-1)\frac{(2j-1)}{10},\ 1 \le i \le 10,\ 1 \le j \le 4.$$

In order to obtain the benefit of perceptual tuning, we apply this technique to DCT coefficients and use quantization step sizes as in a typical JPEG decoder. FIG. 9 illustrates the encoding process. In step 120, an 8×8 block DCT of the image is computed. In step 122, vectors of length 8 are then formed from DCT coefficients of like frequency, separated in space. Each length 8 vector is expanded in step 124 by left-multiplication with the frame operator F, and each length 10 vector is uniformly quantized in step 126 with a step size depending on the frequency. The encoding process illustrated in FIG. 9 can be implemented using, e.g., one or more of the micro $MD_j$ encoders 30-j of FIG. 5B, each of which includes a T block 52 followed by a Q block 53. The T block 52 receives an r-tuple as input and generates a corresponding transformed s-tuple as an output. The Q block 53 receives the s-tuple from the T block 52, and generates a quantized s-tuple as an output, where s is greater than or equal to r.

The reconstruction for the above-described frame-based process may follow a least-squares strategy. It can be shown that the frame-based process of FIG. 9 provides better performance than a corresponding systematic block code when less than eight packets are received, and the performance degrades gracefully as the number of lost packets increases. It should be noted, however, that the process of FIG. 9 may not provide better performance than the corresponding block code when all ten packets are received.

The above-described embodiments of the invention are intended to be illustrative only. For example, image characteristics, e.g., resolution, block size, etc., coding parameters, e.g., quantization, frame type, etc., and other aspects of the examples of FIGS. 8 and 9 may be varied in alternative embodiments of the invention. It should be noted that a complementary decoder structure corresponding to the encoder structure of FIGS. 2, 3, 4 and 5A–5D may be implemented in the MD JSC decoder 16 of FIG. 1. Alternative embodiments of the invention may utilize other coding structures and arrangements. Moreover, the invention may be used for a wide variety of different types of compressed and uncompressed signals, and in numerous coding applications other than those described herein. These and numerous other alternative embodiments within the scope of the following claims will be apparent to those skilled in the art.

What is claimed is:

1. A method of processing an image signal for transmission, comprising the steps of:

encoding a plurality of components of the image signal in a multiple description encoder for transmission over a plurality of channels; and transmitting the encoded components of the image signal;

wherein the encoding step further includes the steps of:

computing a transform of at least a portion of the image signal;

quantizing coefficients of the resulting transform;

forming vectors of transform coefficients separated in frequency and space;

applying correlating transforms to at least a subset of the vectors;

applying entropy coding to the transformed vectors;

grouping the coded vectors as a function of frequency; and applying a cascade transform to at least a subset of the resulting groups.

2. The method of claim 1 wherein the image signal comprises one or more vectors having uncorrelated components.

3. The method of claim 1 wherein the encoding step includes generating a multiple description representation of the image signal with statistical redundancy between the different descriptions.

4. The method of claim 1 wherein the vectors are formed such that spatial separation between the transform coefficients in at least a subset of the vectors is maximized.

5. The method of claim 1 wherein the encoding step includes applying a linear transform, followed by quantization, to generate multiple descriptions of the image signal.

6. The method of claim 1 wherein the encoding step includes encoding n components of the image signal for transmission over m channels using a transform which is in the form of a cascade structure of a plurality of transforms each having dimension less than n×m.

7. A method of processing an image signal for transmission, comprising the steps of:

encoding a plurality of components of the image signal in a multiple description encoder for transmission over a plurality of channels; and transmitting the encoded components of the image signal;

wherein the encoding step further includes the steps of:

computing a transform of at least a portion of the image signal;

forming vectors from coefficients of the resulting transform, wherein each vector includes coefficients of like frequency, separated in space;

expanding the vectors by multiplication with a frame operator; and quantizing the expanded vectors using a quantization step size which is a function of frequency.

8. An apparatus for encoding an image signal for transmission, comprising:

a multiple description encoder for encoding a plurality of components of the image signal for transmission over a plurality of channels, the encoder comprising a plurality of coupled encoder elements and an associated entropy coder, wherein the encoder is operative to compute a transform of at least a portion of the image signal; to quantize coefficients of the resulting transform; to form vectors of transform coefficients separated in frequency and space; to apply correlating transforms to at least a subset of the vectors; to apply entropy coding to the transformed vectors; to group the coded vectors as a function of frequency; and to apply a cascade transform to at least a subset of the resulting groups.

9. The apparatus of claim 8 wherein the image signal comprises one or more vectors having uncorrelated components.

10. The apparatus of claim 8 wherein the encoder generates a multiple description representation of the image signal with statistical redundancy between the different descriptions.

11. The apparatus of claim 8 wherein the vectors are formed such that spatial separation between the transform coefficients in at least a subset of the vectors is maximized.

12. The apparatus of claim 8 wherein the encoder applies a linear transform, followed by quantization, to generate the multiple descriptions of the image signal.

13. The apparatus of claim 8 wherein the encoder is operative to encode n components of the image signal for transmission over m channels using a transform which is in the form of a cascade structure of a plurality of transforms each having dimension less than n×m.

14. The apparatus of claim 8 wherein the encoder further includes a series combination of N multiple description encoder elements followed by the entropy coder, wherein each of the N multiple description encoder elements includes a parallel arrangement of M multiple description encoder elements.

15. The apparatus of claim 14 wherein each of the M multiple description encoder elements implements one of: (i) a quantizer block followed by a transform block, (ii) a transform block followed by a quantizer block, (iii) a quantizer block with no transform block, and (iv) an identity function.

16. An apparatus for encoding an image signal for transmission, comprising:

a multiple description encoder for encoding a plurality of components of the image signal for transmission over a plurality of channels, the encoder comprising a plurality of coupled encoder elements and an associated entropy coder, wherein the encoder is operative to compute a transform of at least a portion of the image signal; to form vectors from coefficients of the resulting transform, wherein each vector includes coefficients of like frequency, separated in space; to expand the vectors by multiplication with a frame operator; and to quantize the expanded vectors using a quantization step size which is a function of frequency.

* * * * *